United States Patent
Hautanen et al.

(10) Patent No.: US 7,057,591 B1
(45) Date of Patent: Jun. 6, 2006

(54) ADVERTISING USING AN EBOOK WITH A BISTABLE DISPLAY

(75) Inventors: Jukka Hautanen, Tampere (FI); Kimmo Djupsjobacka, Palo Alto, CA (US); Ari Aarnio, Espoo (FI)

(73) Assignee: Nokia Corporation, Espoo (FI)

( * ) Notice: Subject to any disclaimer, the term of this patent is extended or adjusted under 35 U.S.C. 154(b) by 628 days.

(21) Appl. No.: 09/903,193

(22) Filed: Jul. 11, 2001

(51) Int. Cl.
*G09G 3/36* (2006.01)

(52) U.S. Cl. .......................... 345/87; 345/211; 705/14

(58) Field of Classification Search ................ 345/901, 345/211, 867, 87, 97, 204, 107; 705/14, 705/26, 27; 455/3.06, 41.2; 715/808
See application file for complete search history.

(56) References Cited

U.S. PATENT DOCUMENTS

| | | | |
|---|---|---|---|
| 5,663,757 A | | 9/1997 | Morales |
| 5,761,485 A * | | 6/1998 | Munyan ..................... 345/839 |
| 5,920,598 A * | | 7/1999 | Hyakudai et al. ........... 375/316 |
| 5,999,912 A * | | 12/1999 | Wodarz et al. ................ 705/14 |
| 6,084,583 A * | | 7/2000 | Gerszberg et al. .......... 345/867 |
| 6,119,098 A * | | 9/2000 | Guyot et al. .................. 705/14 |
| 6,484,011 B1 * | | 11/2002 | Thompson et al. ........ 455/3.06 |
| 6,636,247 B1 * | | 10/2003 | Hamzy et al. ............... 345/808 |
| 6,674,995 B1 * | | 1/2004 | Meyers et al. ............. 455/41.2 |
| 6,804,659 B1 * | | 10/2004 | Graham et al. ................ 705/14 |
| 6,888,522 B1 * | | 5/2005 | Shibata et al. ................ 345/87 |
| 2001/0006389 A1 * | | 7/2001 | Nanba et al. ................ 345/418 |
| 2001/0009417 A1 * | | 7/2001 | Asai et al. .................... 345/204 |
| 2001/0034652 A1 * | | 10/2001 | Kondo et al. .................. 705/14 |
| 2002/0000984 A1 * | | 1/2002 | Asai et al. .................... 345/211 |
| 2002/0033779 A1 * | | 3/2002 | Nakai et al. .................. 345/2.1 |
| 2002/0120564 A1 * | | 8/2002 | Strietzel ....................... 705/40 |
| 2003/0103023 A1 * | | 6/2003 | Ootsuka et al. ............... 345/87 |

FOREIGN PATENT DOCUMENTS

| | | |
|---|---|---|
| EP | 0711076 | 5/1996 |
| EP | 0797368 | 9/1997 |
| JP | 63256038 | 10/1988 |
| JP | 05233893 | 9/1993 |
| JP | 06149168 | 5/1994 |
| JP | 07214941 | 8/1995 |
| JP | 08305327 | 11/1996 |
| JP | 08340310 | 12/1996 |
| JP | 09083991 | 3/1997 |
| JP | 09121302 | 5/1997 |

(Continued)

OTHER PUBLICATIONS

English language abstract corresponding to Patent Publication No. JP10254966, Sep. 25, 1998 (cited above), MicroPatent Reference No. 000568745.

(Continued)

*Primary Examiner*—Regina Liang
(74) *Attorney, Agent, or Firm*—Morgan & Finnegan, L.L.P.

(57) ABSTRACT

A user terminal, such as an eBook, with a bistable display wherein the terminal detects when a predetermined period of user inactivity with respect to loaded content has elapsed and, in response thereto, replaces the last displayed page of content with an advertisement. In one embodiment, advertisements are received from an advertisement server and stored locally in the user terminal at the time that the content is downloaded from a content server. In an alternate embodiment, the user terminal receives an advertisement from the advertisement server only after user inactivity with respect to previously downloaded content has been detected.

65 Claims, 8 Drawing Sheets

FOREIGN PATENT DOCUMENTS

| | | | |
|---|---|---|---|
| JP | 09284425 | | 10/1997 |
| JP | 09305514 | | 11/1997 |
| JP | 09325938 | | 12/1997 |
| JP | 09329449 | | 12/1997 |
| JP | 10027121 | | 1/1998 |
| JP | 10047974 | | 2/1998 |
| JP | 10049591 | | 2/1998 |
| JP | 10063212 | | 3/1998 |
| JP | 10063739 | | 3/1998 |
| JP | 10075220 | | 3/1998 |
| JP | 10105144 | * | 4/1998 |
| JP | 10135945 | | 5/1998 |
| JP | 10164137 | | 6/1998 |
| JP | 10224291 | | 8/1998 |
| JP | 10240828 | | 9/1998 |
| JP | 10254966 | | 9/1998 |
| WO | WO 97/21183 | | 6/1997 |
| WO | WO 97/22066 | | 6/1997 |
| WO | WO 97/32258 | | 9/1997 |
| WO | WO 99/59283 | | 11/1999 |

OTHER PUBLICATIONS

English language abstract corresponding to Patent Publication No. JP10240828, Sep. 11, 1998 (cited above), MicroPatent Reference No. 000554610.

English language abstract corresponding to Patent Publication No. JP10224291, Aug. 21, 1998 (cited above), MicroPatent Reference No. 000538088.

English language abstract corresponding to Patent Publication No. JP10164137, Jun. 19, 1998 (cited above), MircoPatent Reference No. 000477972.

English language abstract corresponding to Patent Publication No. JP10135945, May 22, 1998 (cited above), MicroPatent Reference No. 000022923.

English language abstract corresponding to Patent Publication No. JP10075220, Mar. 17, 1998 (cited above), MicroPatent Reference No. 000422182.

English language abstract corresponding to Patent Publication No. JP10063739, Mar. 6, 1998 (cited above), MicroPatent Reference No. 000410704.

English language abstract corresponding to Patent Publication No. JP10063212, Mar. 6, 1998 (cited above), MicroPatent Reference No. 000410177.

English language abstract corresponding to Patent Publication No. JP10049591, Feb. 20, 1998 (cited above), MicroPatent Reference No. 000396562.

English language abstract corresponding to Patent Publication No. JP10047974, Feb. 20, 1998 (cited above), MicroPatent Reference No. 000394945.

English language abstract corresponding to Patent Publication No. JP10027121, Jan. 27, 1998 (cited above), MicroPatent Reference No. 000374099.

English language abstract corresponding to Patent Publication No. JP09329449, Dec. 22, 1997 (cited above), MicroPatent Reference No. 000181773.

English language abstract corresponding to Patent Publication No. JP09325938, Dec. 16, 1997 (cited above), MicroPatent Reference No. 000178455.

English language abstract corresponding to Patent Publication No. JP09305514, Nov. 28, 1997 (cited above), MicroPatent Reference No. 000052867.

English language abstract corresponding to Patent Publication No. JP09284425, Oct. 31, 1997 (cited above), MicroPatent Reference No. 000082080.

English language abstract corresponding to Patent Publication No. WO 97/32258, Sep. 4, 1997 (cited above).

English language abstract corresponding to Patent Publication No. JP09121302, May 6, 1997 (cited above), MicroPatent Reference No. 000222462.

English language abstract corresponding to Patent Publication No. JP09083991, Mar. 28, 1997 (cited above), MicroPatent Reference No. 000288683.

English language abstract corresponding to Patent Publication No. JP08340310, Dec. 24, 1996 (cited above), MicroPatent Reference No. 000406971.

English language abstract corresponding to Patent Publication No. JP08305327, Nov. 22, 1996 (cited above), MicroPatent Reference No. 001322357.

English language abstract corresponding to Patent Publication No. JP07214941, Aug. 15, 1995 (cited above), MicroPatent Reference No. 000731260.

English language abstract corresponding to Patent Publication No. JP06149168, May 27, 1994 (cited above), MicroPatent Reference No. 001061919.

English language abstract corresponding to Patent Publication No. JP05233893, Sep. 10, 1993 (cited above), MicroPatent Reference No. 003178915.

English language abstract corresponding to Patent Publication No. JP63256038, Oct. 24, 1988 (cited above), MicroPatent Reference No. 004003451.

* cited by examiner

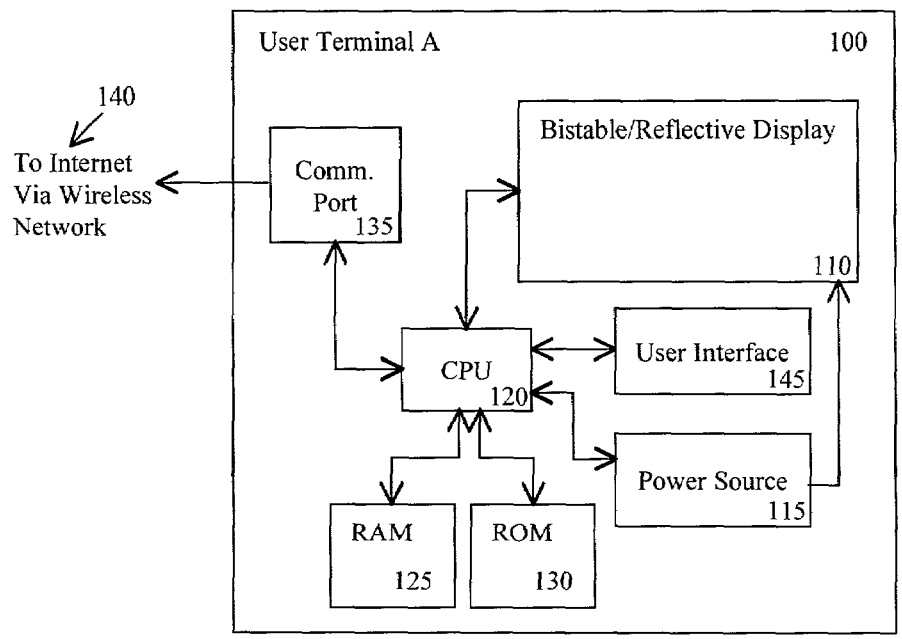
FIG. 1
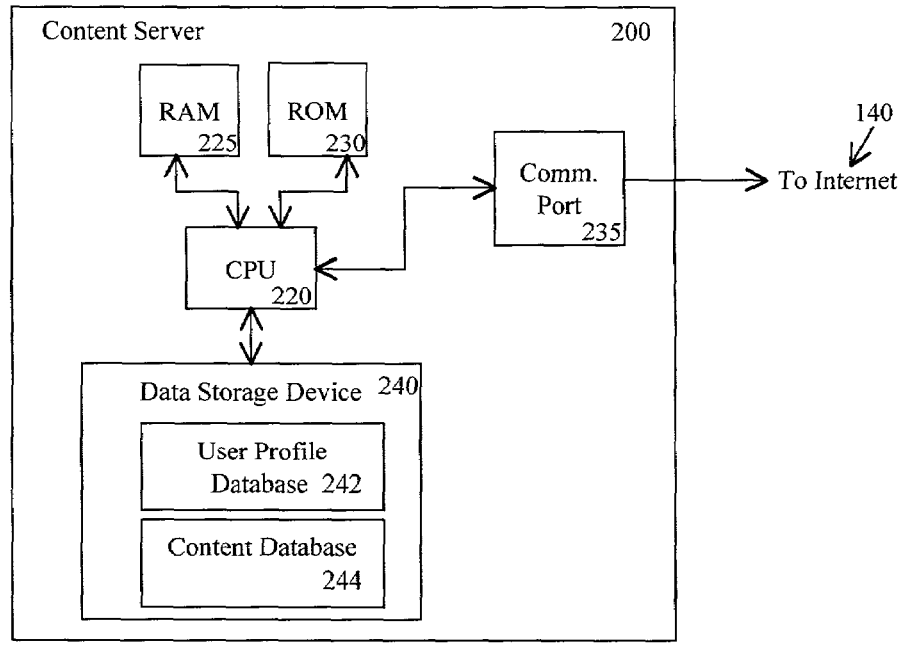
FIG. 2A
| Terminal 245 | Content 246 |
|---|---|
| A | X |
| B | X |
FIG. 2B

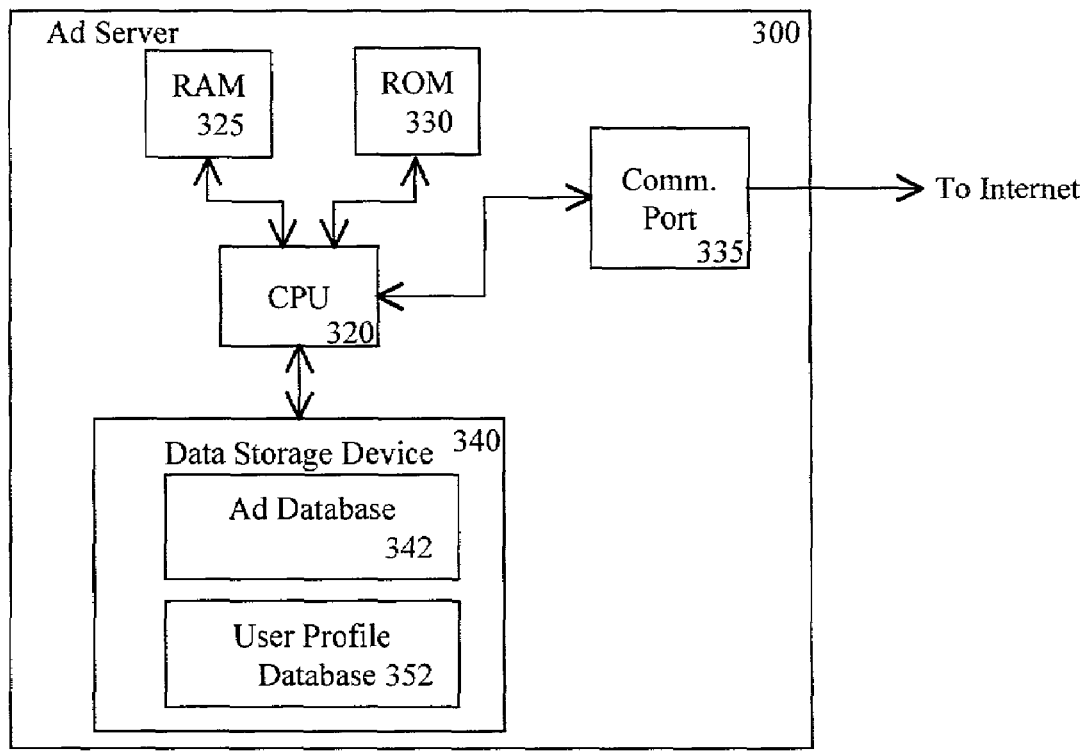
FIG. 3A
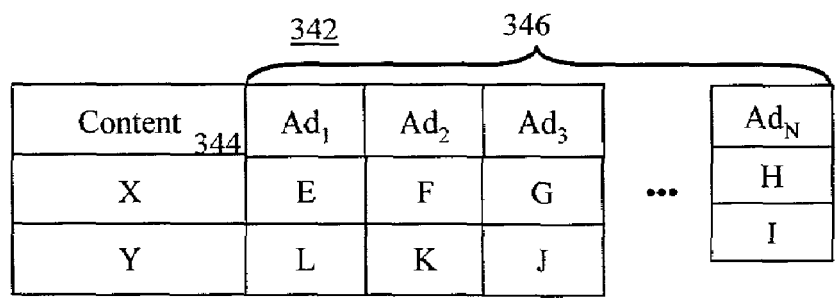
FIG. 3B
| | | 352 | |
|---|---|---|---|
| Terminal 354 | Content 356 | Last Transmitted Ad 358 | |
| A | X | Ad₁ (E) | |
| B | Y | Ad₃(J) | |
FIG. 3C

ADVERTISING USING AN EBOOK WITH A BISTABLE DISPLAY

FIELD OF THE INVENTION

This invention relates generally to wireless communications, and more particularly, to a system and method for advertising to users of devices equipped with a bistable liquid crystal display.

BACKGROUND OF THE INVENTION

Wireless communication devices, such as cellular telephones, pagers, personal data assistants, Palm Pilots™, laptop computers and the like, are quickly becoming ubiquitous. Many of these wireless devices support not only telephone calls, but also e-mail, Internet access, video/audio transmissions, games, etc. This enhanced functionality has also led to the ability to display electronic advertising on these devices. In some instances, the electronic advertising is displayed after a predetermined period of user inactivity has been detected. In such cases, however, the electronic advertising is displayed while consuming battery power, a precious resource in wireless devices.

An electronic book ("eBook") is another wireless device, which comprises a communications terminal with a fairly large display that permits electronic versions of printed books to be loaded from either local or remote digitized libraries and displayed for user consumption. Some eBooks are equipped with a Cholesteric liquid crystal display ("ChLCD"). A ChLCD is an advanced reflective display technology, which contains a bistable, non-volatile memory feature. Once an image is written to a ChLCD, the image will remain on the display after power is removed, indefinitely, until a new image is generated. Thus, an eBook with a ChLCD will display the last page read by the user indefinitely, even after the power to the display has been removed. Power is only needed to change the image on the display. However, in eBooks equipped with a ChLCD, power is only applied to change the image from the current page of the electronic version of the book being read to the next page, not to display advertising after detecting user inactivity.

SUMMARY OF THE INVENTION

The above-identified problems are solved and a technical advance is achieved in the art by providing a system and method for advertising to a user of a terminal equipped with a bistable display.

An exemplary method in accordance with one embodiment includes receiving an advertisement at the time of downloading content, displaying the content on a bistable display, detecting user inactivity with respect to the content, displaying the advertisement on the display; and removing power to the display, wherein the advertisement remains on the display after the power has been removed.

An exemplary method in accordance with an alternate embodiment includes displaying content on a bistable display, transmitting an indication of user inactivity, receiving an advertisement, displaying the advertisement on the display and removing power to the display, wherein the advertisement remains on the display after power has been removed.

Yet another exemplary method in accordance with another embodiment includes storing content, storing advertisements linked to the content, receiving a request for content from a user terminal having a bistable display, transmitting the requested content to the user terminal, receiving an indication of user inactivity at the user terminal with respect to the requested content, selecting an advertisement linked to the requested content and transmitting the selected advertisement to the user terminal for display.

Other and further aspects of the present invention will become apparent during the course of the following description and by reference to the attached drawings.

BRIEF DESCRIPTION OF THE DRAWINGS

FIG. 1 is a block diagram of an exemplary user terminal with a bistable/reflective display.

FIG. 2A is a block diagram of an exemplary content server.

FIG. 2B illustrates exemplary records in a user profile database of the content server of FIG. 2A.

FIG. 3A is a block diagram of an exemplary advertisement server.

FIG. 3B illustrates exemplary records in an advertisement database of the advertisement server of FIG. 3A.

FIG. 3C illustrates exemplary records in a user profile database of the advertisement server of FIG. 3A.

DETAILED DESCRIPTION

Figure 4:
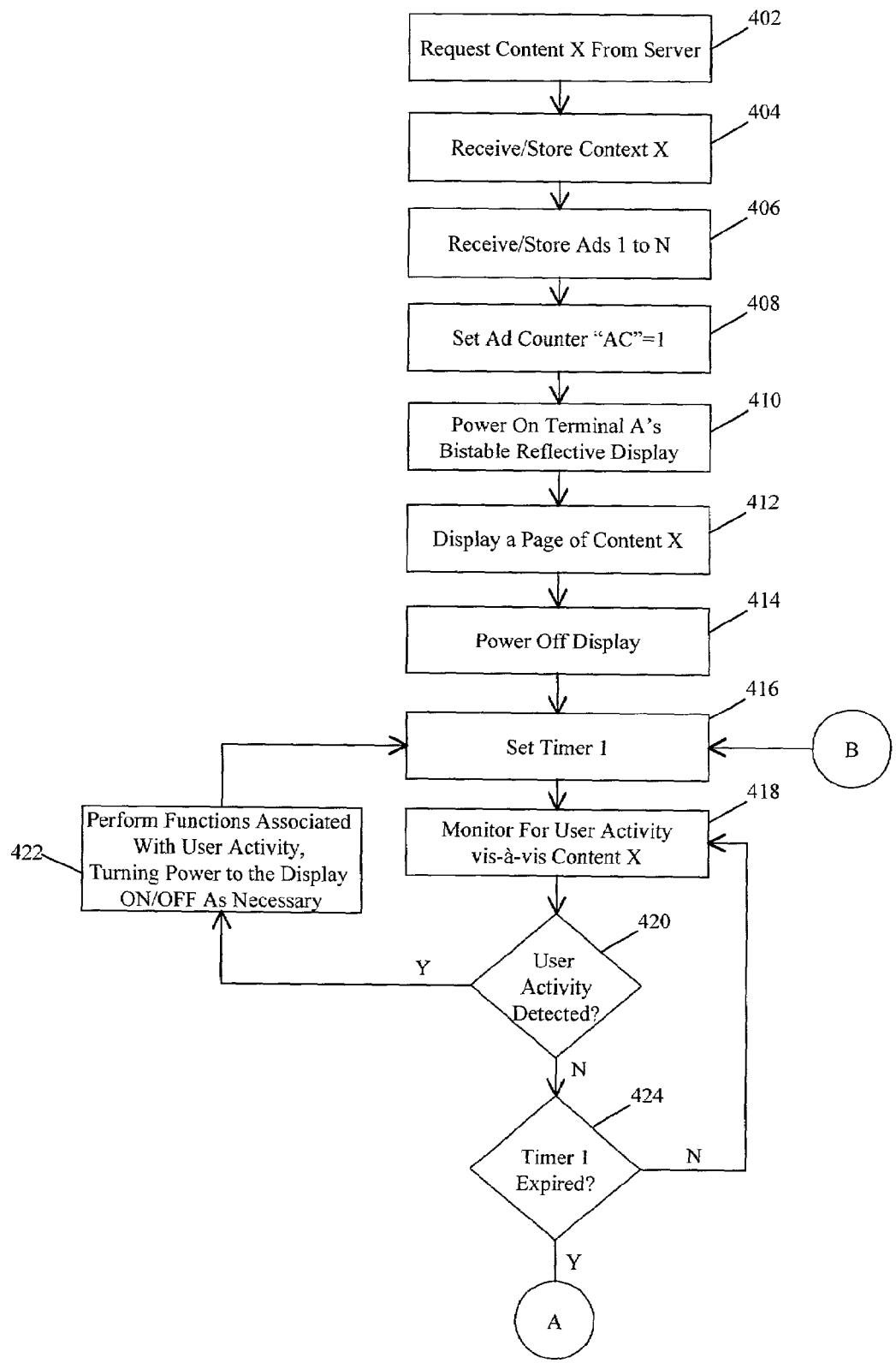
FIG. 4 is a flowchart illustrating an exemplary process by which a user terminal with a bistable/reflective display displays content and ads in accordance with one embodiment of the present invention.
Figure 4:
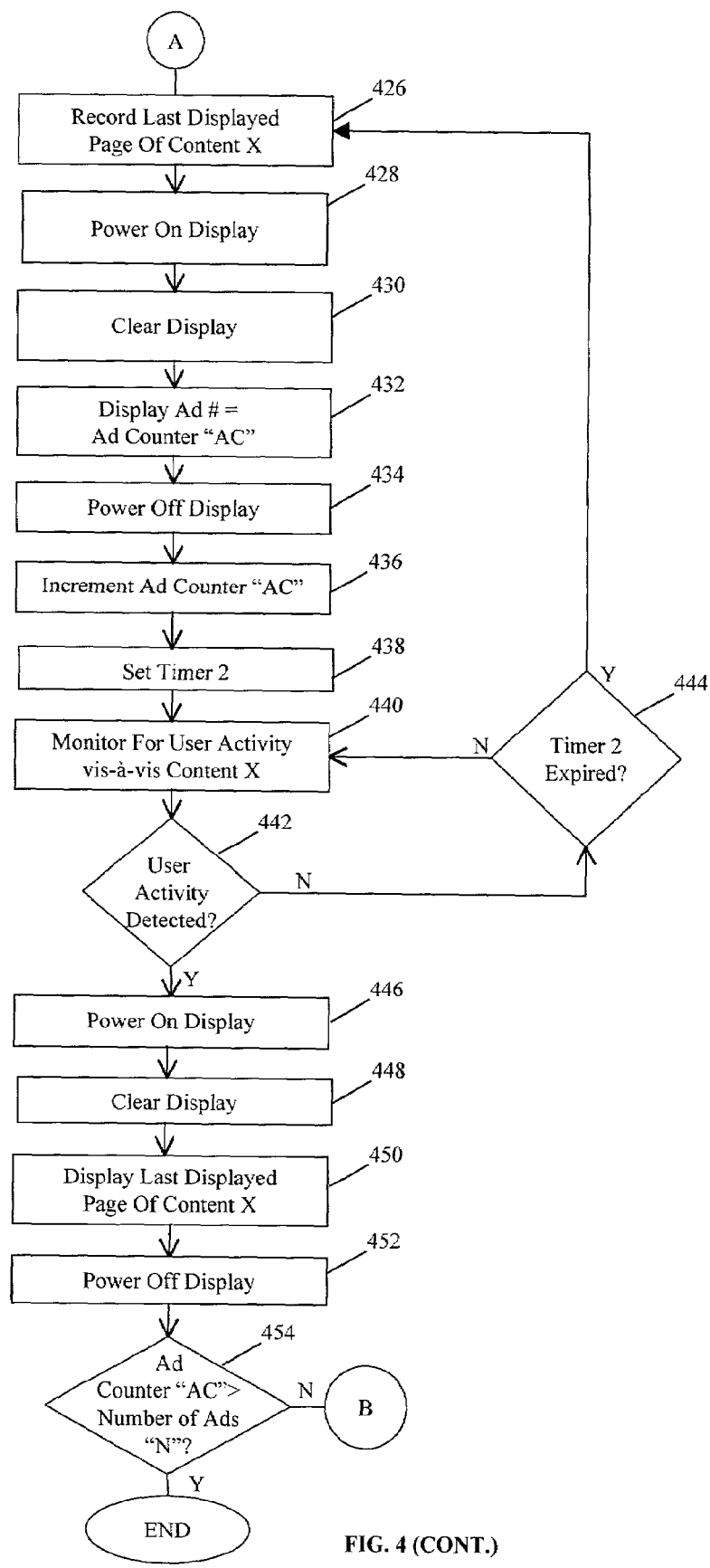

Referring now to FIG. 1, there is shown, in accordance with one embodiment of the present invention, a block diagram of an exemplary user terminal 100, such as an eBook, equipped with a bistable/reflective display 110. Once an image is written to bistable/reflective display 110, the image will remain on the display after power from power source 115 is removed, indefinitely, until a new image is generated. The bistable/reflective display 110 of terminal 100 is preferably a cholesteric liquid crystal display ("ChLCD"), as is well known in the art.

Terminal 100 also includes a CPU 120 together with associated memory (125, 130) for performing a variety of functions including receiving and displaying content and advertisements on display 110, monitoring for user activity, and controlling the supply of power to display 110 for purposes of switching display 110 between content and advertisements after a predetermined period has elapsed without user activity, as will be discussed in detail hereinafter in connection with FIGS. 4 and 6.

In one embodiment, terminal 100 downloads and stores advertisements at the same time that it downloads and stores content for user consumption. In an alternate embodiment, terminal 100 downloads advertisements only after detecting that a predetermined period has elapsed without user activity. The alternate embodiment permits advertisements to be transmitted directly to display 110, thereby eliminating the need for a separate memory for storing advertisements. In both embodiments, displaying advertisements does not consume electricity, and thus, an advertisement can be displayed indefinitely (currently up to several months), until user activity is detected, at which time, power is applied to the display to remove the advertisement and resume displaying content where the user left off.

As shown in FIG. 1, terminal 100 includes a communications port 135 coupled to a data network 140, such as the Internet, for receiving both content and advertising from network-based servers via a wireless connection. The wireless connection may be a cellular network, such as a GSM network, or a wireless LAN ("WLAN") or Bluetooth network. Terminal 100's receipt of content and advertisements over the Internet, however, is intended to be illustrative, rather than limiting, as content may be received via any conventional mechanism, including DVB-T transmissions. Thus, in an alternate embodiment, terminal 100 also includes a conventional DVB-T receiver (not shown) for this purpose. As further shown in FIG. 1, terminal 100 also includes a user interface 145 for receiving user commands to initiate such functions as requesting content from a web-based server and manipulating content, for example, by instructing CPU 105 to display the next page of content after the current page has been read by the user.

FIG. 2A is a block diagram of an exemplary content server 200. As shown in FIG. 2A, content server 200 includes a CPU 220 and associated memory (225, 230) for performing such functions as receiving and responding to requests for content from a user terminal 100 and communicating with an advertisement server 300. Communications with advertisement server 300 include notifying advertisement server 300 of the content downloaded by a particular user terminal 100. In one embodiment, content server 200 also notifies advertisement server 300 of user inactivity with respect to that content, so that the advertisement server 300 can transmit advertisements associated with that content to terminal 100 for display to the user during periods of user inactivity.

Content server 200 includes a communications port 235 to connect to a data network 140, such as the Internet, for receiving and responding to requests for content from terminals 100 and for communicating with advertisement server 300. Content server 200 may also employ a conventional DVB-T transmitter (not shown) to broadcast or multicast content to user terminals 100 in response to requests received, e.g., via the Internet.

CPU 220 is also coupled to a data storage device 240, which includes a user profile database 242 for tracking content requested by, and delivered to, a particular user terminal 100. Storage device 240 also includes a content database 244 for storing the content available for downloading by terminal 100. User profile database 242 is discussed further in connection with FIG. 2B.

FIG. 2B illustrates exemplary records in user profile database 242 of content server 200. As shown in FIG. 2B, each record corresponds to a particular user terminal 100 and includes a field for a terminal identifier 245, such as an IP address for use in transmitting content to user terminal 100, and field for a content identifier 246, such as the name of the content.

FIG. 3A is a block diagram of an exemplary advertisement server 300. As shown in FIG. 3A, advertisement server 300 includes a CPU 320 and associated memory (325, 330) for performing such functions as receiving notices from content server 200 that a particular user terminal 100 has downloaded particular content; receiving notices of inactivity with respect to that content; and transmitting advertisements associated with content to terminal 100. Advertisement server 300 also includes a communications port 335 for connecting to a data network, such as the Internet, for receiving and responding to such notices from content server 200. Advertisement server 300 can alternatively employ a conventional DVB-T transmission, rather than the Internet, to broadcast or multicast advertisements to user terminals 100 in response to notices received from the content server 200 via the data network. CPU 320 is also coupled to a data storage device 340, which includes a plurality of databases including an advertisement database 342 for associating advertisements with content and a user profile database for associating user terminals 100 with content and advertisements. These databases (342, 352) are discussed below in connection with FIGS. 3b and 3C.

FIG. 3B illustrates exemplary records in an advertisement database 342 of the advertisement server 300 of FIG. 3A. As shown in FIG. 3B, each record corresponds to a particular piece of content and includes a field 344 for a content identifier and a plurality of fields 346 for storing a plurality of advertisement identifiers.

FIG. 3C illustrates exemplary records in a user profile database 352 of the advertisement server 300 of FIG. 3A. As shown in FIG. 3C, each record corresponds to a particular user terminal and includes a field 354 for a terminal identifier, a field 356 for a content identifier 356 and a field 358 for tracking the last advertisement transmitted to the user terminal 100 for display.

Although content server 200 and advertisement server 300 have been depicted in FIGS. 2 and 3 as distinct entities, it is to be understood that these two servers readily could be combined into a single server without departing from the spirit and scope of the present invention.

FIG. 4 is a flowchart illustrating an exemplary process by which a user terminal 100 with a bistable/reflective display 110 displays content and ads in accordance with one embodiment of the present invention. In this embodiment, terminal 100 receives advertisements from advertisement server 300 and stores them locally at substantially the same time that terminal 100 downloads the associated content from content server 200.

In step 402 of FIG. 4, terminal 100 transmits a request for content "x" such as an electronic book to content server 200 via a wireless connection to a data network 140, such as the Internet. The request includes the IP addresses of both the terminal 100 and the server 200, as the source and destination addresses of the request, respectively. In step 404, terminal 100 receives and stores content "x". In step 406, terminal 100 also receives and stores one or more advertisements associated with content "x" from advertisement server 300. In an alternate embodiment, the advertisements may take the form of hyperlinks embedded in the downloaded content, which are displayed as discussed below in connection with steps 428–434 after a period of user inactivity has been detected.

In step 408, terminal 100 sets an advertisement counter "AC" equal to 1. In steps 410–414, terminal 100 powers on the bistable/reflective display 110, displays a page of content "x" and then powers off the display. As previously noted, the page of content "x" will remain on display 110 even after power from power source 115 has been removed.

In step 416, terminal 100 sets an inactivity timer and, in step 418, begins to monitor for user activity with respect to content "x". Such activity may include an instruction to display the next page of content, for example, after the current page has already been read by the user. In step 420, if user activity is detected, then, in step 422, terminal 100 performs the functions associated with the activity, turning power to display 110 "ON" and "OFF", as necessary. For example, if a page turn instruction is detected, power to display 110 is turned "ON" to remove the current page and replace it with the new page. Thereafter, power to display 110 is turned "OFF" to conserve power. After terminal 100 performs the functions associated with the detected user activity, control is returned to step 416, wherein the timer is re-set and steps 416–422 are repeated until, in step 420, no user activity has been detected.

If, in step 420, no user activity has been detected, then, in step 424, terminal 100 determines whether the timer set in step 416 has expired. If the timer has not expired, then control is returned to step 418, wherein monitoring for user activity vis-à-vis content "x" is resumed and steps 416 to 424 are repeated until, in step 424, the timer expires without user activity having been detected. If, in step 424, the timer has expired, then, in step 426, terminal 100 records the page of content "x" currently being displayed. In steps 428–434, terminal 100 powers on display 110, clears the content currently being displayed, displays the advertisement corresponding to counter AC, and then powers off display 110. The bistable characteristics of display 110 will cause the image of the advertisement to remain on display 110 even after power from power source 115 has been removed.

In step 436, terminal 100 increments advertisement counter "AC" to "point" to the next stored advertisement to be displayed. In step 438, terminal 100 sets a second timer. The second timer is used to determine whether to change the advertisement during the period of user inactivity. In step 440, terminal 100 monitors for user activity with respect to content "x", such as the above-discussed request from the user to resume reading. If, in step 442, no user activity has been detected, a determination is made in step 444 whether the second timer has expired. If the second timer has not expired, control is returned to step 440, wherein terminal 100 continues to monitor for user activity with respect to content "x". However, if it is determined in step 444 that the second timer has expired, then control is returned to step 428 wherein the terminal 100 powers on display 110 and, in steps 430–434 clears the advertisement currently being displayed, displays the next advertisement identified by counter AC, and then powers off display 110.

In step 436, terminal 100 again increments advertisement counter "AC" to point to the next stored advertisement to be displayed. In step 438, terminal 100 resets Timer 2. In step 440, terminal 100 resumes monitoring for user activity with respect to content "x". In step 442, if terminal 100 has detected user activity, then, in steps 446–450, terminal 100 powers on display 100, clears the advertisement currently being displayed, displays the last displayed page of content "x" (i.e., the page of content recorded in step 426), and then powers off display 110.

In step 454, terminal 100 determines whether the advertisement counter "AC" has exceeded the number of advertisements that terminal 100 downloaded and stored in step 406. If the advertisement counter has not exceeded the number of stored advertisements, then control is returned to step 416, and the process of displaying advertisements in response to a period of user inactivity in accordance with the present invention is repeated until the stored advertisements are exhausted. If, however, the advertisement counter has exceeded the number of stored advertisements, then the process of displaying advertisements in accordance with the present invention ends.

It will be appreciated that rather than ending the process of displaying advertisements when the number of advertisements downloaded in step 406 is exhausted, terminal 100 may instead repeat the process starting with the first displayed advertisement, for example, by resetting the advertisement counter to "1" prior to returning to step 416. Alternatively, advertisements may be randomly displayed by randomly selecting from the set of advertisements stored in advertisement database 346.

Figure 5A:
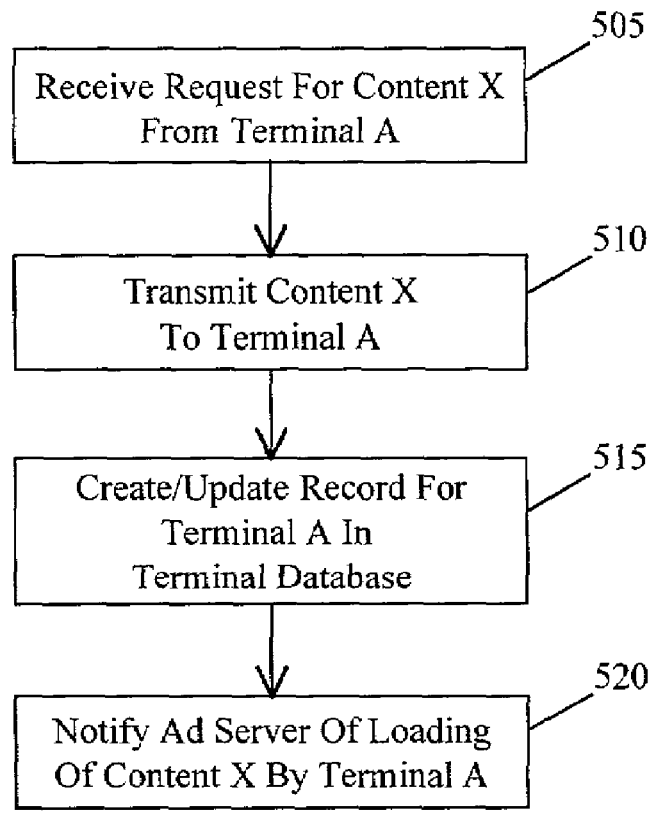
FIG. 5A is a flowchart illustrating an exemplary process by which a content server handles requests for content in accordance with the embodiment of the present invention discussed in connection with FIG. 4.

FIG. 5A is a flowchart illustrating an exemplary process by which a content server 200 handles requests for content in accordance with the embodiment of the present invention discussed above in connection with FIG. 4.

In step 505 of FIG. 5A, content server 200 receives a request for content "x" from terminal 100. The request includes the IP addresses of both the terminal 100 and the server 200, as the source and destination addresses, respectively. In step 510, content server 200 retrieves content "x" from content database 244 and transmits content "x" to terminal 100. In step 515, content server 200 updates terminal 100's record in user profile database 242 to reflect that content "x" has been transmitted to terminal 100. Although not shown, billing information may also be recorded in user profile database 242 at this time. In step 520, content server 200 notifies advertisement server 300 that content x has been transmitted to terminal 100. The communication between servers (200, 300) preferably occurs over a data network such as the Internet, and includes the IP address of user terminal 100 so that advertisement database 300 will be able to transmit advertisements to terminal 100.

Figure 5B:
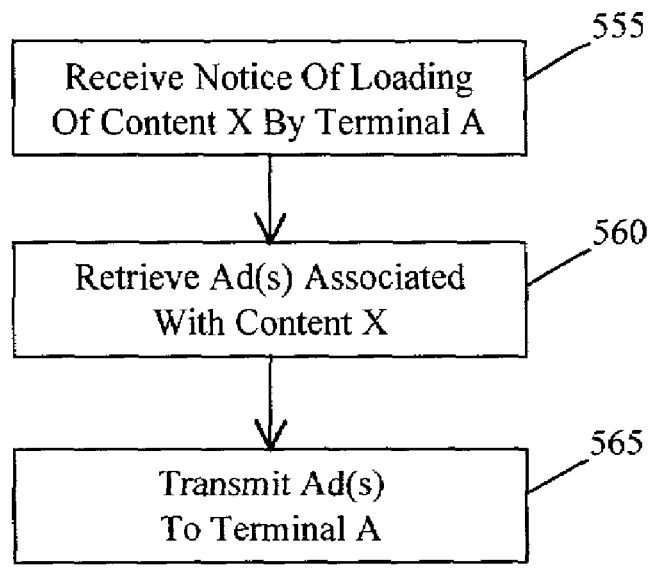
FIG. 5B is a flowchart illustrating an exemplary process by which an advertisement server transmits ads to a user terminal in accordance with the embodiment discussed in connection with FIG. 4.

FIG. 5B is a flowchart illustrating an exemplary process by which an advertisement server 300 transmits ads to a user terminal 100 in accordance with the embodiment discussed above in connection with FIG. 4.

In step 555 of FIG. 5B, advertisement server 300 is notified by content server 200 that content "x" has been transmitted to terminal 100. As previously indicated, the notification includes the IP address of user terminal 100. In step 560, advertisement server 300 retrieves advertisements associated with content "x" from advertisement database 342. In step 565, advertisement server 300 transmits these advertisements to terminal 100.

Figure 6:
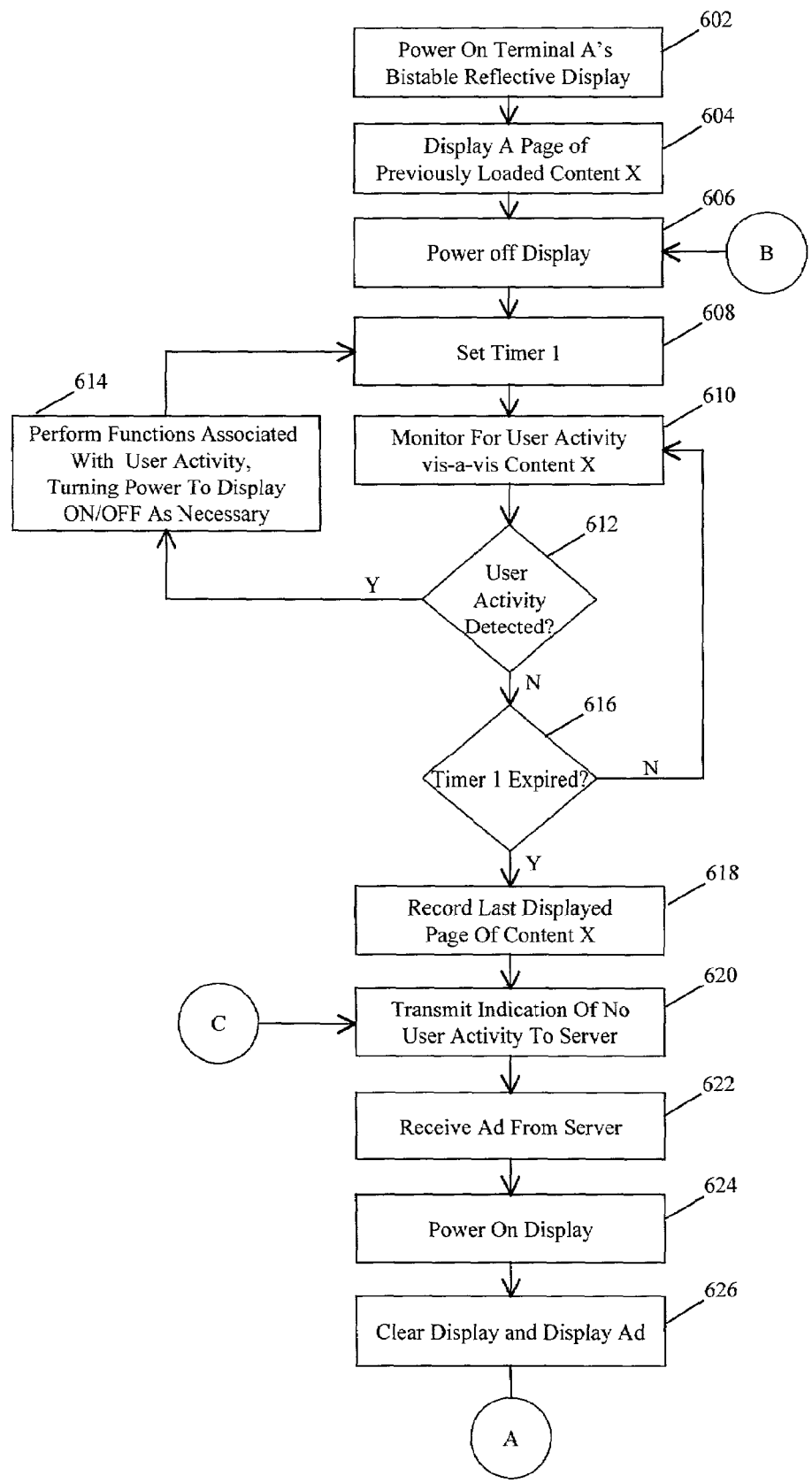
FIG. 6 is a flowchart illustrating an exemplary process by which a user terminal with a bistable/reflective display displays content and ads in accordance with an alternate embodiment of the present invention.
Figure 6:
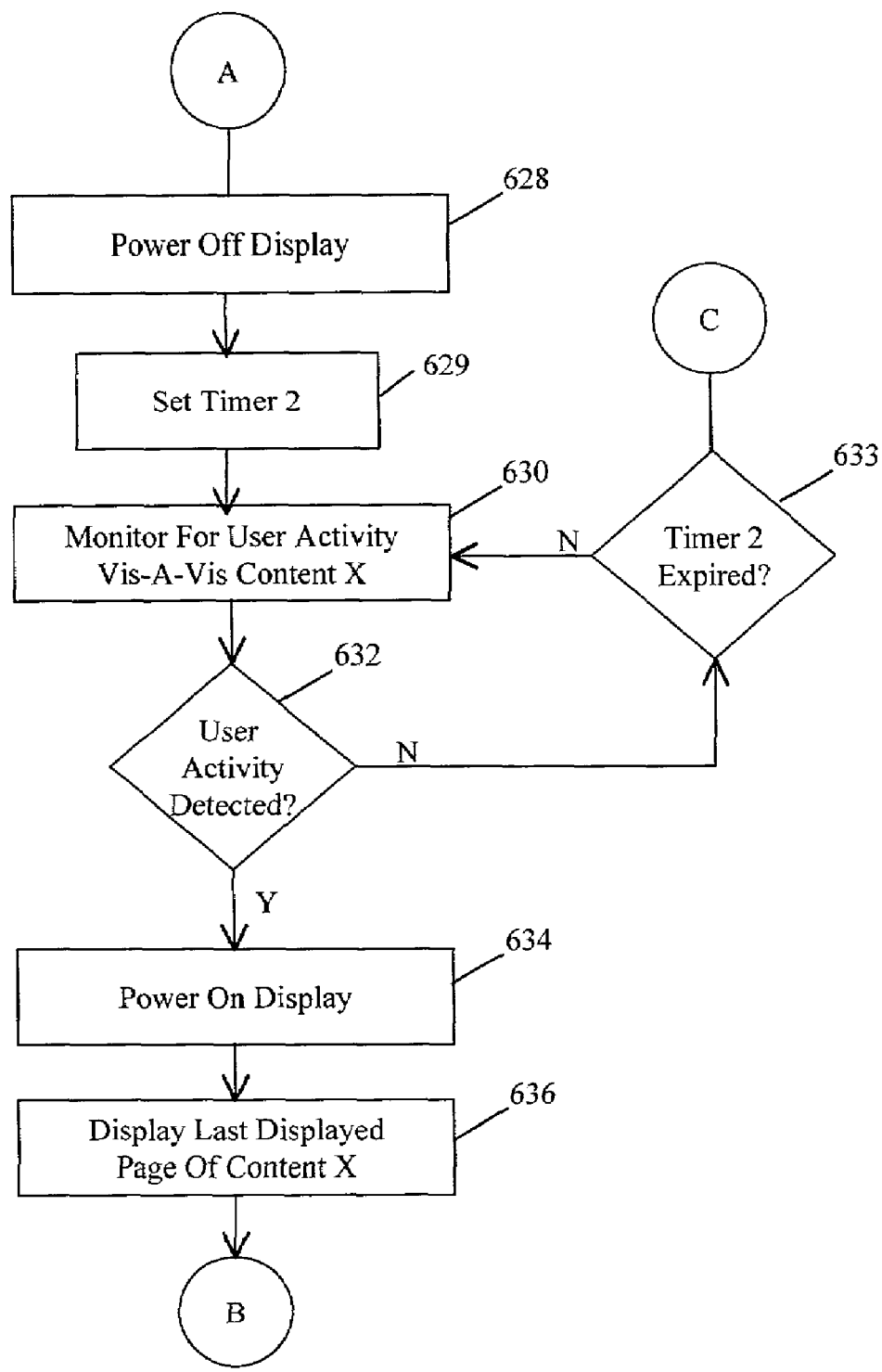

FIG. 6 is a flowchart illustrating an exemplary process by which a user terminal with a bistable/reflective display displays content and advertisements in accordance with an alternate embodiment of the present invention.

In this embodiment, terminal 100 receives an advertisement from advertisement server 300 only after a predetermined period has elapsed without user activity with respect to previously downloaded content. Thus, this embodiment has several advantages over the embodiment discussed above in connection with FIG. 4. For example, in this embodiment, the displayed advertisement is always "up-to-date"; it is downloaded and displayed at the time of detecting user inactivity, rather than at a possibly much earlier time when the content was downloaded from content server 200.

This embodiment also does not require a display memory in terminal 100 for storing all of the advertisements associated with a particular piece of content; instead, display 110 acts as the memory for each advertisement as it is received.

In step 602, terminal 100 powers on its bistable/reflective display 110. In step 604, terminal 100 displays a page of previously downloaded content "x" on display 110. In step 606, terminal 100 powers off display 110. As previously discussed, the content will remain on display 110 even after power from power source 115 has been removed. In step 608, terminal 100 sets an inactivity Timer 1 and, in step 610, begins monitoring for user activity with respect to content "x".

In step 612, if user activity has been detected, then, in step 614, terminal 100 performs the functions associated with that activity, turning power to display 110 "ON" and "OFF", as necessary. After terminal 100 performs the functions associated with the detected user activity, control is returned to step 608, wherein Timer 1 is re-set and steps 610–614 are repeated until, in step 612, no user activity has been detected.

If, in step 612, no user activity has been detected, then, in step 616, terminal 100 determines whether the Timer 1 has expired. If Timer 1 has not yet expired, then control is returned to step 610, wherein monitoring for user activity continues and steps 608 to 616 are repeated until, in step 616, the timer expires without user activity having been detected. If, in step 616, Timer 1 expired, then, in step 618, terminal 100 records the last displayed page of content "x" (i.e., the page currently being displayed).

In step 620, terminal 100 transmits a message to content server 200 indicating that there has not been any user activity with respect to previously downloaded content "x" for a predetermined period of time (e.g., that the user has stopped reading the electronic book). In step 622, terminal 100 receives an advertisement from advertisement server 300. In step 624, terminal 100 powers on display 110 and, in step 626, clears the last displayed page of content and substitutes therefor the advertisement received in step 622. In step 628, terminal 100 powers off the display. The image of the advertisement will remain on display 110 even after power has been removed. In step 629, Timer 2 is set. Timer 2 is used to determine whether to change the advertisement during the period of user inactivity.

In step 630, terminal 100 monitors for user activity with respect to the previously downloaded content "x". The user activity may be, for example, an instruction to resume reading the content. In step 632, if user activity is not detected vis-à-vis content "x", then in step 633, terminal 100 determines whether Timer 2 has expired, and thus, whether it is time to replace the currently displayed advertisement with a new advertisement. If Timer 2 has not expired, then terminal 100 simply repeats steps 630–633, wherein terminal 100 monitors for user activity and checks Timer 2. If Timer 2 has expired, then steps 620–633 are repeated, wherein a new advertisement is obtained from the server, the old advertisement is replaced with the new advertisement on display 110. However, once terminal 100 detects user activity in step 632, then, in step 634, terminal 100 powers on display 110 and displays the last displayed page of content "x". After step 636, control is returned to step 606, wherein display 110 is powered off and the process of monitoring for user activity and switching between content and advertisements is repeated, preferably until the user has entirely consumed the stored content.

Figure 7A:
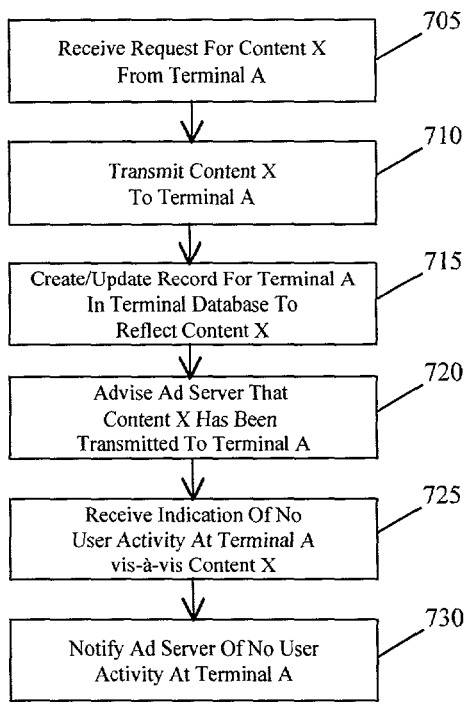
FIG. 7A is a flowchart illustrating an exemplary process by which a content server handles requests for content in accordance with the embodiment of the present invention discussed in connection with FIG. 6.

FIG. 7A is a flowchart illustrating an exemplary process by which a content server 200 handles requests for content in accordance with the embodiment of the present invention discussed above in connection with FIG. 6.

In step 705 of FIG. 7A, content server 200 receives a request for content "x" from terminal 100. The request includes the IP addresses of both the terminal 100 and the server 200. In step 710, content server 200 retrieves content "x" from content database 244 and transmits content "x" to terminal 100. In step 715, content server 200 creates/updates terminal 100's record in user profile database 242 to reflect that content "x" has been transmitted to terminal 100. In step 720, content server 200 notifies advertisement server 300 that content x has been transmitted to terminal 100. As in the embodiment of FIG. 5A, the communication between servers (200, 300) preferably occurs over a data network and includes the IP address of user terminal 100 for use by advertisement database 300 in transmitting advertisements to terminal 100. In step 725, content server 200 receives an indication from terminal 100 that there has not been any user activity with respect to previously downloaded content "x" for a predetermined period of time. In step 730, content server 200 notifies advertisement server 300 of the user inactivity at terminal 100 with respect to content "x".

Figure 7B:
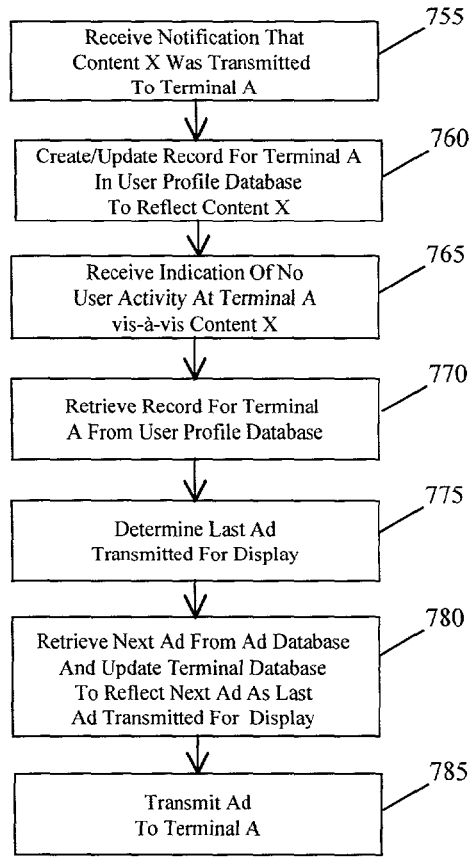
FIG. 7B is a flowchart illustrating an exemplary process by which an advertisement server transmits ads to a user terminal in accordance with the embodiment discussed in connection with FIG. 6.

FIG. 7B is a flowchart illustrating an exemplary process by which an advertisement server 300 transmits ads to a user terminal 100 in accordance with the embodiment discussed above in connection with FIG. 6.

In step 755 of FIG. 7B, advertisement server 300 is notified by content server 200 that content "x" has been transmitted to terminal 100. The notification includes the IP address of user terminal 100. In step 760, advertisement server 300 updates terminal 100's record in user profile database 352 to reflect that content "x" has been transmitted to terminal 100. In step 765, advertisement server 300 is notified by content server 200 that there has not been any user activity at terminal 100 with respect to content "x" for a predetermined period of time. In step 770, advertisement server 300 accesses terminal 100's record in user profile database 352 and, in step 775, determines the last advertisement transmitted to terminal 100 for display.

If this is the first time that advertisement server 300 has been notified of no user activity at terminal 100 vis-à-vis content "x", the last transmitted advertisement field 358 of user terminal 100's record will be blank, otherwise it will contain an identifier indicating the last advertisement transmitted to terminal 100 for display. In step 780, advertisement server 300 accesses the record for content "x" in advertisement database 342 and retrieves the next advertisement to be transmitted to terminal 100. It will be understood that the advertisement may be randomly selected. Server 300 then updates terminal 100's record in user profile database 352 by entering the identity of the retrieved advertisement in the "last transmitted ad" field 358 of the record. In step 785, advertisement server 300 transmits the advertisement retrieved in step 780 to terminal 100 for display to the user.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

For example, user terminal 100 shown in FIG. 1 may be enabled with a low power radio frequency technology, such as Bluetooth, for establishing connections to, and exchanging information with, other user terminals 100, in a manner well known in the art.

In one variation of the present invention, the information exchanged between terminals 100 is content that has been downloaded from content server 200. Thus, terminal A can transmit content to terminal B. Either terminal A or terminal B would then notify advertisement server 300 of the content transfer at the time thereof. The notice of the transfer would include such information as an identification of both the recipient terminal (e.g., an IP address) and the content transferred, as well as perhaps the date/time of the transfer. The notice could be provided either directly to server 300 or via content server 200. In this regard, terminal A or B may be pre-programmed with the IP address of servers 200, 300 for purposes of communicating therewith or may have obtained the IP address from the source address field of packets received from servers 200, 300 that contain content or advertisement information. Terminal B, having received the content from terminal A, would then begin receiving and displaying advertisements from advertisement server 300 in accordance with either of the inventive processes discussed above in connection with FIGS. 4 and 6. Advertisement server 300 sends the advertisements preferably via the Internet and a wireless connection such as GSM, WLAN, Bluetooth, etc.

Alternatively, in the event that terminal A originally received and stored all of the advertisements associated with the content it downloaded in accordance with the process of FIG. 4, terminal B could receive the advertisements from terminal A via the Bluetooth connection, rather than from advertisement server 300. Thereafter, terminal B, like terminal A, will then display the advertisements in accordance with the process of FIG. 4.

In another variation, terminal A receives information such as the IP addresses of terminals 100 that have been in close proximity of it. Terminal A preferably receives this information by way of the low power radio frequency connection with the other terminals 100, and transmits the information to advertisement server 300. The information could be transmitted either directly to server 300 or via content server 200. The advertisement server 300, having knowledge of the content that terminal A previously downloaded, and now, the identities of the terminals 100 in proximity of terminal A, transmits advertisements to the other terminals 100 for display, in accordance with either of the inventive processes discussed above in connection with FIGS. 4 and 6, provided that the user terminal profiles of the other terminals 100 indicate that such advertisements would be appropriate for them. The "appropriateness" of an advertisement may be based on information in user profile database 352 such as information indicating that the other terminals 100 have previously downloaded similar content as terminal A. The advertisements are sent to the other terminals 100 preferably via the Internet and a wireless connection such as GSM, WLAN, Bluetooth, etc.

We claim:

1. A method of advertising to a user of a terminal, comprising:
   displaying content on a bistable display;
   transmitting, from the terminal, an indication of user inactivity;
   receiving an advertisement via one of an Internet or a digital video broadcast network;
   displaying the advertisement on the display; and
   removing power to the display, wherein the advertisement remains on the display after power has been removed.

2. The method of claim 1 wherein the display is a bistable reflective display.

3. The method of claim 1 further comprising:
   receiving the content; and
   detecting a predetermined period of user inactivity with respect to the content.

4. The method of claim 3 wherein the content and advertisement are received via the Internet.

5. The method of claim 3 wherein the content and advertisement are received via a digital video broadcasting—terrestrial (DVB-T) receiver.

6. The method of claim 1 wherein the content is a page of an electronic book and further comprising:
   detecting a page turn at a particular time,
   wherein the period of user inactivity begins with the time of the page turn and ends a predetermined time later.

7. The method of claim 1 wherein the advertisement remains on the display for an extended period of time after power has been removed.

8. The method of claim 1 further comprising:
   displaying a different advertisement on the display after a predetermined period of time.

9. The method of claim 1 wherein the advertisement replaces the content on the display.

10. The method of claim 1, further comprising:
    removing power to the display after displaying the content, wherein the content remains on the display after power has been removed.

11. The method of claim 1, further comprising:
    adding power to the display to clear the content and display the advertisement.

12. The method of claim 1 further comprising:
    transferring content to a second terminal.

13. The method of claim 12 further comprising:
    notifying an advertisement server of the content transfer.

14. The method of claim 13 wherein the advertisement server is notified via a content server.

15. The method of claim 13 wherein notifying the advertisement server of the content transfer includes transmitting an identification of the transferred content and the second terminal.

16. The method of claim 15 wherein the identification of the second terminal is an Internet protocol (IP) address.

17. The method of claim 1 further comprising:
    receiving information about other terminals that are in close proximity of the terminal; and
    transmitting the information to an advertisement server.

18. The method of claim 17 wherein the information about other terminals that are in close proximity of the terminal is received via a low power radio frequency connection.

19. The method of claim 18 wherein the connection is a Bluetooth connection.

20. A method of advertising to a user of a mobile terminal comprising:
    receiving an advertisement at the time of downloading content;
    displaying content on a bistable display, wherein the content is a page of an electronic book;
    detecting a page turn;
    detecting user inactivity with respect to the content,
    wherein the period of user inactivity begins with the time of the page turn and ends a predetermined time later;
    displaying the advertisement on the display; and removing power to the display, wherein the advertisement remains on the display after the power has been removed.

21. The method of claim 20 further comprising:
receiving a plurality of advertisements at the time of downloading content;
wherein the advertisement displayed is randomly selected from the plurality of advertisements.

22. The method of claim 20 wherein the display is a bistable reflective display.

23. The method of claim 20 wherein the content and advertisement are received via the Internet.

24. The method of claim 20 wherein the content and advertisement are received via a digital video broadcasting—terrestrial (DVB-T) receiver.

25. The method of claim 20 wherein the advertisement remains on the display for an extended period of time after power to the display has been removed.

26. The method of claim 20 further comprising:
displaying a different advertisement on the display after a predetermined period of time.

27. The method of claim 20 wherein the advertisement replaces the content on the display.

28. The method of claim 20, further comprising:
removing power to the display after displaying the content, wherein the content remains on the display after power has been removed.

29. The method of claim 20, further comprising:
adding power to the display to clear the content and display the advertisement.

30. The method of claim 20 further comprising:
transferring content to a second terminal.

31. The method of claim 30 further comprising:
notifying an advertisement server of the content transfer.

32. The method of claim 31 wherein the advertisement server is notified via a content server.

33. The method of claim 31 wherein notifying an advertisement server of the content transfer includes transmitting an identification of the transferred content and the second terminal.

34. The method of claim 33 wherein the identification of the second terminal is an Internet protocol (IP) address.

35. The method of claim 20 further comprising:
receiving information about other terminals that are in close proximity of the terminal; and
transmitting this information to an advertisement server.

36. The method of claim 35 wherein the information about other terminals that are in close proximity of the terminal is received via a low power radio frequency connection.

37. The method of claim 36 wherein the connection is a Bluetooth connection.

38. The method of claim 20 wherein the advertisement is a hyperlink on text.

39. A method of advertising to a user of a terminal having a bistable display, comprising:
storing content;
storing advertisements linked to the stored content;
receiving a request for content from the user terminal;
transmitting the requested content to the user terminal;
receiving an indication of user inactivity at the user terminal with respect to the requested content;
selecting an advertisement linked to the requested content;
transmitting the selected advertisement to the user terminal for display;
receiving notice that the terminal has transferred the requested content to a second terminal having a bistable display; and
in response to the notice, transmitting the advertisement linked to the requested content to the second terminal.

40. The method of claim 39 wherein the advertisement is transmitted via the Internet.

41. The method of claim 39 wherein the advertisement is transmitted via a digital video broadcasting—terrestrial (DVB-T) transmitter.

42. The method of claim 39 wherein the advertisement is randomly selected from a plurality of advertisements.

43. The method of claim 39 wherein the advertisement is a hyperlink.

44. The method of claim 39 wherein the notice includes an identification of the transferred content and the second terminal.

45. The method of claim 39 wherein the advertisements are linked to the transferred content.

46. The method of claim 39 further comprising:
receiving information about other terminals that are in close proximity of the terminal; and
transmitting advertisements to the other terminals.

47. A user terminal for advertising, comprising:
a memory device storing a program; and
a processor in communication with the memory device, the processor operative with the program to:
display content on a bistable display;
transmit, from the terminal, an indication of user inactivity;
receive an advertisement via one of an Internet or a digital video broadcast network;
display the advertisement on the display; and
remove power to the display, wherein the advertisement remains on the display after power has been removed.

48. An apparatus for advertising to a user of a mobile terminal, comprising:
a memory device storing a program; and
a processor in communication with the memory device, the processor operative with the program to:
receive an advertisement at the time of downloading content;
display content on a bistable display, wherein the content is a page of an electronic book;
detect a page turn;
detect user inactivity with respect to the content,
wherein the period of user inactivity begins with the time of the page turn and ends a predetermined time later;
display the advertisement on the display; and
remove power to the display, wherein the advertisement remains on the display after the power has been removed.

49. A system for advertising to a user of a user terminal having a bistable display, comprising:
a memory device storing a program; and
a processor in communication with the memory device, the processor operative with the program to:
store content;
store advertisements linked to the stored content;
receive a request for content from the user terminal;
transmit the requested content to the user terminal;
receive an indication of user inactivity at the user terminal with respect to the requested content;
select an advertisement linked to the requested content;
transmit the selected advertisement to the user terminal for display;

receive notice that the terminal has transferred the requested content to a second terminal having a bistable display; and in response to the notice, transmitting an advertisement linked to the requested content to the second terminal.

50. A method of advertising to a user of a terminal, comprising:

displaying content on a bistable display;

transmitting, from the terminal, an indication of user inactivity;

receiving an advertisement via one of an Internet or a digital video broadcast network;

displaying the advertisement on the display; and removing power to the display after displaying the advertisement, wherein the advertisement remains on the display after power has been removed and wherein power remains removed until user activity is detected.

51. A method of advertising to a user of a terminal having a bistable display, comprising:

storing content;

storing advertisements linked to the stored content;

receiving a request for content from the user terminal;

transmitting the requested content to the user terminal;

receiving an indication of user inactivity from the user terminal with respect to the requested content;

selecting an advertisement linked to the requested content; and transmitting the selected advertisement to the user terminal for display.

52. The method of claim 51, further comprising:

receiving an indication of user inactivity at the user terminal with respect to the requested content; and in response to receiving the indication of user inactivity, performing the steps of selecting an advertisement linked to the requested content and transmitting the selected advertisement to the user terminal.

53. The method of claim 51 wherein the selected advertisement is transmitted separately from the requested content.

54. The method of claim 51, wherein the advertisement is a hyperlink embedded in the requested content.

55. The method of claim 51 further comprising:

after a predetermined period of user inactivity at the user terminal has expired, receiving a request for a new advertisement to replace the advertisement currently displayed on the user terminal; and transmitting the new advertisement to the user terminal for display in lieu of the advertisement currently displayed.

56. The method of claim 51 further comprising:

updating a record associated with the user terminal to reflect that the content has been transmitted to the user terminal.

57. The method of claim 51 wherein the content is stored in a content server and the advertisements linked to the stored content are stored in an advertisement server and further comprising:

the content server notifying the advertisement server that the content has been transmitted to the user terminal; and the advertisement server, selecting the advertisement linked to the requested content; and transmitting the selected advertisement to the user terminal.

58. A system for advertising to a user of a user terminal having a bistable display, comprising:

a memory device storing a first program; and a content processor in communication with the memory device, the content processor operative with the first program to:

store content;

store advertisements linked to the stored content;

receive a request for content from the user terminal;

transmit the requested content to the user terminal; and a memory device storing a second program; and an advertisement processor in communication with the memory device, the advertisement processor operative with the second program to:

receive an indication of user inactivity from the user terminal with respect to the requested content;

select an advertisement linked to the requested content; and transmit the selected advertisement to the user terminal for display on the user terminal.

59. The system of claim 58, wherein the content processor is further operative with the first program to:

notify the advertisement processor that the content has been transmitted to the user terminal, and wherein the advertisement processor is further operative with the second program to:

in response to being notified that the content has been transmitted to the user terminal, perform the steps of selecting an advertisement linked to the requested content and transmitting the selected advertisement.

60. The system of claim 58, wherein the content processor is further operative with the first program to:

receive an indication of user inactivity at the user terminal with respect to the requested content; and notify the advertisement processor of the indication of user inactivity; and wherein the advertisement processor is further operative with the second program to:

in response to receiving the indication of user inactivity, perform the steps of selecting an advertisement linked to the requested content and transmitting the selected advertisement.

61. The system of claim 58 wherein the selected advertisement is transmitted separately from the requested content.

62. The system of claim 58, wherein the advertisement is a hyperlink embedded in the requested content.

63. The system of claim 58 wherein the advertisement processor is further operative with the second program to:

after a predetermined period of user inactivity at the user terminal has expired, receive a request for a new advertisement to replace the advertisement currently displayed on the user terminal;

select a new advertisement linked to the requested content; and transmit the new advertisement for display on the user terminal in lieu of the advertisement currently displayed.

64. The system of claim 58 wherein the content processor is further operative with the first program to:

update a record associated with the user terminal to reflect that the content has been transmitted to the user terminal.

65. The system of claim 58 wherein the content processor and the advertisement processor are the same processor.

* * * * *